United States Patent
Shiga (10) Patent No.: US 9,032,313 B2
(45) Date of Patent: May 12, 2015

(54) TERMINAL DEVICE CONFIGURED TO RUN A PLURALITY OF FUNCTIONS IN PARALLEL INCLUDING AN AUDIO-RELATED FUNCTION, AND CONTROL PROGRAM THEREOF

(75) Inventor: Akio Shiga, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 692 days.

(21) Appl. No.: 12/564,725

(22) Filed: Sep. 22, 2009

(65) Prior Publication Data

US 2010/0107069 A1 Apr. 29, 2010

(30) Foreign Application Priority Data

Oct. 23, 2008 (JP) .................................. 2008-272659

(51) Int. Cl.
- G06F 3/00 (2006.01)
- G06F 9/00 (2006.01)
- G06F 17/00 (2006.01)
- H04M 1/725 (2006.01)
- H04M 1/02 (2006.01)

(52) U.S. Cl.
CPC ........ *H04M 1/72522* (2013.01); *H04M 1/0241* (2013.01); *H04M 1/72558* (2013.01)

(58) Field of Classification Search
CPC ....... G06F 8/38; G06F 3/0481; G06F 3/0486; G06F 3/04847; G06F 9/4443; G06F 8/34; G06F 3/0482; H04N 1/00389; H04N 1/00411

USPC ......... 715/762, 763, 765, 863, 864, 865, 727, 715/728, 729, 720
See application file for complete search history.

(56) References Cited

U.S. PATENT DOCUMENTS

| | | | |
|---|---|---|---|
| 7,050,835 B2* | 5/2006 | Hack et al. ................... 455/566 |
| 7,225,409 B1* | 5/2007 | Schnarel et al. ............. 715/747 |
| 2003/0144034 A1* | 7/2003 | Hack et al. ................... 455/566 |
| 2004/0061773 A1* | 4/2004 | Liu ............................ 348/14.02 |
| 2005/0183083 A1* | 8/2005 | Mathiske et al. ................ 718/1 |
| 2006/0097991 A1* | 5/2006 | Hotelling et al. ............. 345/173 |
| 2006/0164382 A1* | 7/2006 | Kulas et al. .................. 345/156 |
| 2006/0176781 A1* | 8/2006 | King et al. ................ 369/30.01 |
| 2007/0275757 A1* | 11/2007 | Yoo et al. ..................... 455/557 |
| 2008/0003985 A1* | 1/2008 | Jung et al. ................. 455/414.1 |
| 2008/0022279 A1* | 1/2008 | Jung ............................. 718/100 |
| 2008/0062140 A1* | 3/2008 | Hotelling et al. ............. 345/173 |
| 2008/0256477 A1* | 10/2008 | Cho et al. ..................... 715/772 |
| 2008/0297483 A1* | 12/2008 | Kim et al. .................... 345/173 |
| 2008/0318618 A1* | 12/2008 | Park ............................ 455/550.1 |
| 2009/0066666 A1 | 3/2009 | Sagou |

FOREIGN PATENT DOCUMENTS

JP 2004-173137 6/2004

* cited by examiner

*Primary Examiner* — William Bashore
*Assistant Examiner* — Anita D Chaudhuri (57) ABSTRACT

In a mobile phone, even when an audio-related function is running in background processing in parallel with a function running in the main processing (foreground processing) where operations by the main operating section have been assigned to the function running in the main processing, the control section operates the audio-related function based on a user operation detected by the touch screen, the imaging section, the sound collecting section, or the housing movement detecting section.

5 Claims, 10 Drawing Sheets

IN-OPERATION FLAG

| | IN-OPERATION FLAG |
|---|---|
| 0 | MUSIC PLAYER IS NOT RUNNING |
| 1 | MUSIC PLAYER IS RUNNING IN MAIN PROCESSING |
| 2 | MUSIC PLAYER IS RUNNING IN BACKGROUND PROCESSING |

FIG. 3B

DETECTING SECTION FLAG

| | DETECTING SECTION FLAG |
|---|---|
| 0 | MUSIC PLAYER RUNNING IN BACKGROUND IN NOT OPERATED |
| 1 | USE DETECTION RESULT FROM COORDINATE POSITION DETECTING SECTION TO OPERATE MUSIC PLAYER RUNNING IN BACKGROUND |
| 2 | USE DETECTION RESULT FROM IMAGING SECTION TO OPERATE MUSIC PLAYER RUNNING IN BACKGROUND |
| 3 | USE DETECTION RESULT FROM SOUND COLLECTING SECTION TO OPERATE MUSIC PLAYER RUNNING IN BACKGROUND |
| 4 | USE DETECTION RESULT FROM CASING MOVEMENT DETECTING SECTION TO OPERATE MUSIC PLAYER RUNNING IN BACKGROUND |

FIG. 3C

STYLE FLAG

| | STYLE FLAG | |
|---|---|---|
| | TWO-SHAFT HINGE-TYPE | SLIDING-TYPE |
| 0 | OTHER THAN VIEW STYLE | OPENED STYLE |
| 1 | VIEW STYLE | CLOSED STYLE |

FIG. 4

MOVEMENT TABLE

| OPERATION CONTENTS FOR AUDIO-RELATED FUNCTION | USER OPERATIONS WITH RESPECT TO EACH DETECTING SECTION FLAG | | | |
|---|---|---|---|---|
| | 1 | 2 | 3 | 4 |
| VOLUME UP | INTER-TWO-POINT EXTENDING DRAG | SWING FINGER UPWARD | VOICE "UP" | SWING HOUSING UPWARD |
| VOLUME DOWN | INTER-TWO-POINT SHORTENING DRAG | SWING FINGER DOWNWARD | VOICE "DOWN" | SWING HOUSING DOWNWARD |
| PLAY BACK | SINGLE-POINT-TAP | PUSH FINGER FORWARD | VOICE "PLAY" | PUSH HOUSING FORWARD |
| STOP | | | VOICE "STOP" | |
| NEXT CONTENT | SINGLE-POINT DOUBLE-TAP | SWING FINGER TO RIGHT | VOICE "NEXT" | SWING HOUSING TO RIGHT |
| PREVIOUS CONTENT | TWO-POINT DOUBLE-TAP | SWING FINGER TO LEFT | VOICE "BACK" | SWING HOUSING TO LEFT |

TERMINAL DEVICE CONFIGURED TO RUN A PLURALITY OF FUNCTIONS IN PARALLEL INCLUDING AN AUDIO-RELATED FUNCTION, AND CONTROL PROGRAM THEREOF

CROSS-REFERENCE TO RELATED APPLICATION

This application is based upon and claims the benefit of priority from the prior Japanese Patent Application No. 2008-272659, filed Oct. 23, 2008, the entire contents of which is incorporated herein by reference.

BACKGROUND OF THE INVENTION

1. Field of the Invention

The present invention relates to a terminal device including a display section and an operating section, which is capable of running a plurality of functions including an audio-related function in parallel, and a control program thereof.

2. Description of the Related Art

In recent years, there has been growing improvement in the processing capacity of mobile phones, and parallel processing that, for example, allows a user to read received mail or access a website while listening to music is becoming possible. In such a case where a function for viewing received mail or a function for viewing a website on the Internet is running in main processing (foreground processing), and a music player function is running in the background processing, when an operation related to music such as song selection is performed, a procedure is required to be performed in which the music player function is temporarily switched to run in the main processing and then switched back to run in the background processing.

However, when a procedure such as described above is performed, the user is inconvenienced.

Therefore, conventionally, there has been disclosed a technology that enables a music player function running in background processing to be operated by providing a second operating section (refer to, for example, Japanese Patent Application Laid-Open (Kokai) Publication No. 2004-173137).

In the above-mentioned conventional technology, because a dedicated operating section is provided to enable the operation of a function related to music running in background processing, even when a music playback function and another function are performed in parallel, operations related to music can be performed without terminating a function other than the music playback function. However, on the other hand, providing a dedicated operating section causes new problems such as an increase in cost and a difficulty in miniaturization.

SUMMARY OF THE INVENTION

The present invention has been conceived to solve the above-described issues. An object of the present invention is to provide a terminal device that enables, when a plurality of functions including an audio-related function are operating in parallel, the operation of the audio-related function running in the background processing without a dedicated operating section being provided for the audio-related function.

In order to achieve the above-described object, in accordance with one aspect of the present invention, there is provided a terminal device including a display section and an operating section, which is capable of running a plurality of functions including an audio-related function in parallel, comprising: an operation detecting means for detecting a user operation; a storage means for storing a user operation detected by the operation detecting section in association with an operation related to the audio-related function; an operation state judging means for judging whether or not the audio-related function is running in background processing in parallel with a function running in foreground processing; and a controlling means for, when the operating state judging means judges that the audio-related function is running in the background processing, assigning an operation by the operating section to the function running in the foreground processing while assigning the user operation detected by the operation detecting section to the audio-related function, and performing, when the operation detecting means detects a user operation, control such that the operation related to the audio-related function stored in the storage means in association with the user operation is performed.

In accordance with another aspect of the present invention, there is provided a computer-readable storage medium having a program stored thereon that is executable by a computer to perform a process comprising: parallel processing for processing a plurality of functions including an audio-related function in parallel; operation detection processing for detecting a user operation; storage processing for storing and managing the detected user operation in association with an operation related to the audio-related function; operation state judgment processing for judging whether or not the audio-related function is running in background processing in parallel with a function running in a foreground process; and control processing for, when the audio-related function is judged to be running in the background processing, assigning an operation by an operating section to the function running in the foreground process while assigning the detected user operation to the audio-related function, and performing, when a user operation is detected, control such that the operation related to the audio-related function stored in association with the user operation is performed.

In the present invention, when a plurality of functions including an audio-related function are running in parallel in a terminal device, the operation of the audio-related function running in the background processing can be performed without an operating section dedicated to the audio-related function being provided. Therefore, the present invention is highly effective in practical use.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a flowchart showing an overview of overall operations of a mobile phone that start when power is turned ON;

DETAILED DESCRIPTION OF THE PREFERRED EMBODIMENTS

The present invention will hereinafter be described in detail with reference to the preferred embodiments shown in the accompanying drawings.

Figure 1:
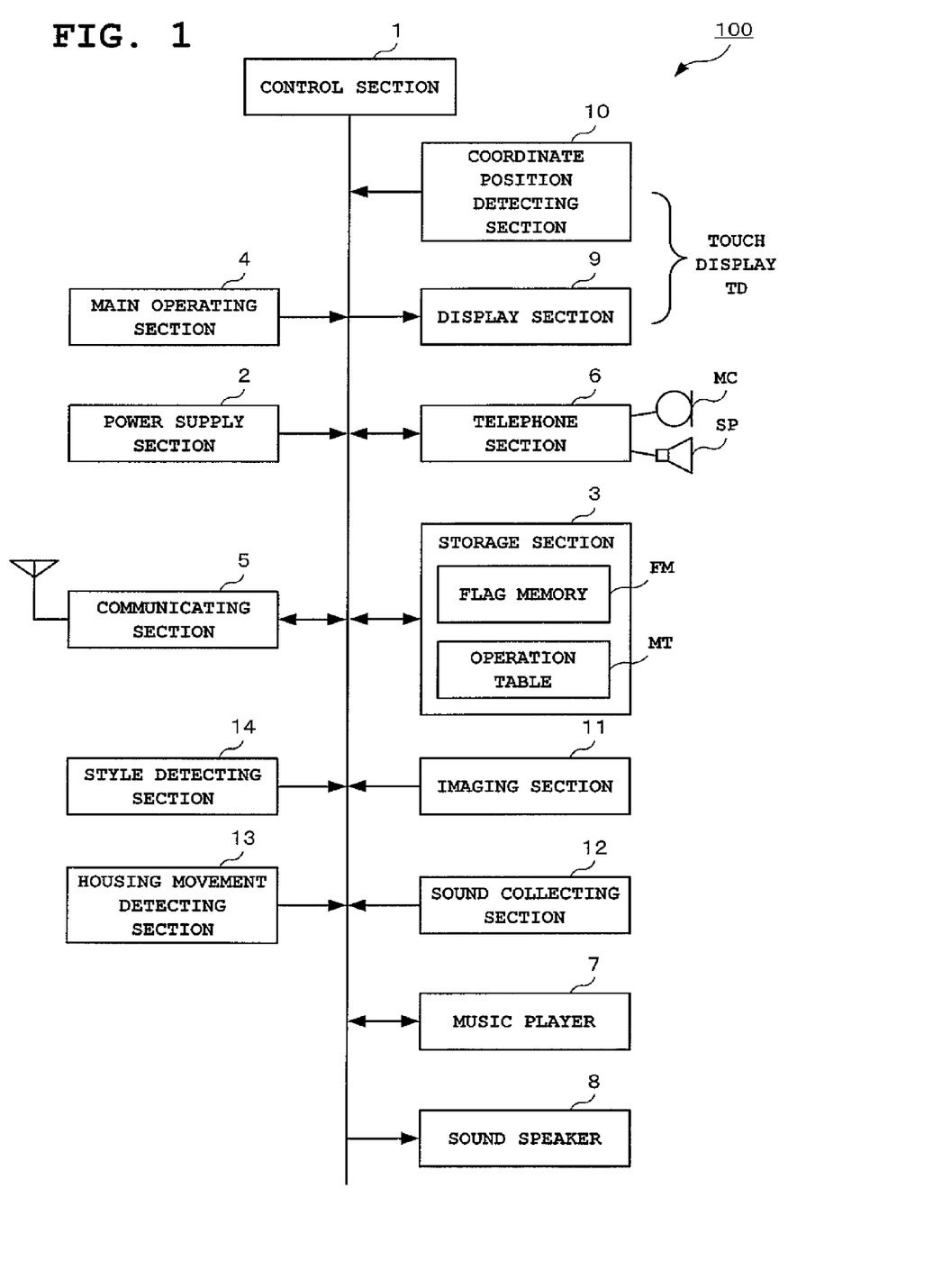
FIG. 1 is a block diagram showing basic components of a mobile phone device serving as a terminal device.

An embodiment shown in FIG. 1 to FIG. 10 is an example of the present invention applied to a mobile phone device (mobile phone 100) as a terminal device. FIG. 1 is a block diagram showing basic components of the mobile phone 100.

The mobile phone 100 provides various functions such as a call function, an electronic mail function, an Internet connection function (web access function), a music playback function, a camera function, a recording function, a pedometer (Manpokei—registered trademark) function, etc.

Each section of the mobile phone 100 will be described in sequence. First, a control section 1, which operates using power supplied from a power supply section 2 including a secondary battery, controls overall operations of the mobile phone 100 based on various programs stored in a storage section 3. A central processing unit (CPU), a memory, and the like are included in this control section 1.

The storage section 3 (storage means) is an internal memory such as a read-only memory (ROM) or a random-access memory (RAM), and has a program area and a data area. Programs used to actualize the present embodiment in accordance with operation procedures shown in FIG. 6 to FIG. 10, described hereafter, are stored in this program area. Also, a flag memory FM, an operation table MT, and the like are provided in the data area.

Note that the storage section 3 may include a removable portable memory (recording medium) such as a secure digital (SD) card or an integrated chip (IC) card.

A main operating section 4 is a main operating section that performs dial-input, text-input, command-input, etc. The control section 1 performs various processing such as incoming call processing in accordance with key input signals from this main operating section 4.

A communicating section 5 includes a wireless section, a baseband section, a demultiplexing section, and the like, and exchanges data with a nearest base station during the operation of, for example, the call function, the electronic mail function, or the internet connection function. When the call function is running, the communicating section 5 receives signals from the receiving side of the baseband section and demodulates the signals into received baseband signals. Then, after outputting the received baseband signals as audio from a call speaker SP via a telephone section 6, the communicating section 5 receives, from the telephone section 6, audio data inputted from a call microphone MC, and encodes the audio data into transmission baseband signals. Subsequently, after sending the encoded transmission baseband signals to the transmitting side of the baseband section, the communicating section 5 transmits the encoded transmission baseband signals from an antenna.

A music player 7, which provides a music playback function, reads out music content arbitrarily selected by a user operation as a playback subject from the storage section 3, and outputs the music content from a sound speaker 8. A display section 9 includes a high-definition liquid crystal display, an organic electroluminescent (EL) display, or the like and displays icons, text data, an image for standby display, a picked-up image, etc. This display section 9 constitutes a touch screen (touch display) TD by a coordinate position detecting section (a transparent contact sensor constituting a touch operation surface) 10, which detects a contact position (coordinate position) of an object such as a finger or a utensil, being laminated on its display panel. The coordinate position detecting section 10 constituting the touch display TD is a coordinate inputting means that detects a coordinate-input operation (touch operation) for inputting a coordinate position on the touch display TD (display section 9).

When the coordinate position detecting section 10 detects that a user has performed, as a user operation performed on the touch display TD, a touch operation such as a single-point tap, a single-point double tap, or a two-point double tap described hereafter, the control section 1 performs processing in accordance with the user operation (the single-point tap, the single-point double tap, or the two-point double tap). When the user performs a touch operation on a touch key (software key) positioned as required on the touch display TD, the coordinate position detecting section 10 outputs a key operation signal corresponding to the touch key and the control section 1 performs processing based on the key operation signal. As just described, the touch display TD constituted by the display section 9 and the coordinate position detecting section 10 is used as a operation detecting section for detecting a user operation (touch) as well as being used as a touch key operating section.

An imaging section 11, which provides a camera function that is capable of taking moving images in addition to still images, includes a distance measuring sensor, a light intensity sensor, an analog processing circuit, a signal processing circuit, a compression extension circuit, and the like in addition to an imaging lens, a lens/mirror block, an image sensor, and a driving system thereof, and controls the adjustment of optical zoom, drive during auto focus, shutter drive, exposure, white balance, and the like. The control section 1 analyzes an image picked up by the imaging section 11, and after detecting a user operation such as a "swing finger upward" or "swing finger to the right", performs processing corresponding to this user operation (gesture). As just described, the imaging section 11 is used as an operation detecting section for detecting a user operation as well as being used for the camera function.

A sound collecting section 12, which provides a recording function for recording music content and the like, is a microphone into which the user inputs his voice ("voice" herein includes a sound made by the user). This control section 1 detects a voice command such as "up", "play", and "stop" as a user operation by analyzing (performing voice recognition of) inputted voice from the sound collecting section 12, and performs processing corresponding to this user operation (voice command). As just described, the sound collecting section 12 is used as an operation detecting section for detecting a user operation as well as being used for the recording function.

A housing movement detecting section 13 includes, for example, a three-axis-type acceleration sensor, and provides a pedometer function. The control section 1 detects, as a user operation, a swing direction in which a device main body is swung such as "swing housing upward", "swing housing downward", "push housing forward", "swing housing to the right", and "swing housing to the left" based on a detection result from the housing movement detecting section 13, and performs processing corresponding to this user operation (swing of housing). As just described, the housing movement detecting section 13 is used as an operation detecting section that detects a user operation as well as being used for the pedometer function. A style detecting section 14 detects a style of the device main body based on the connecting state of a plurality of housings constituting the device main body, and includes, for example, an electromagnetic sensor, a micro switch, a mechanical switch, and the like. The control section 1 identifies each style of the device main body based on respective detection signals from the style detecting section 14.

Figure 2A:
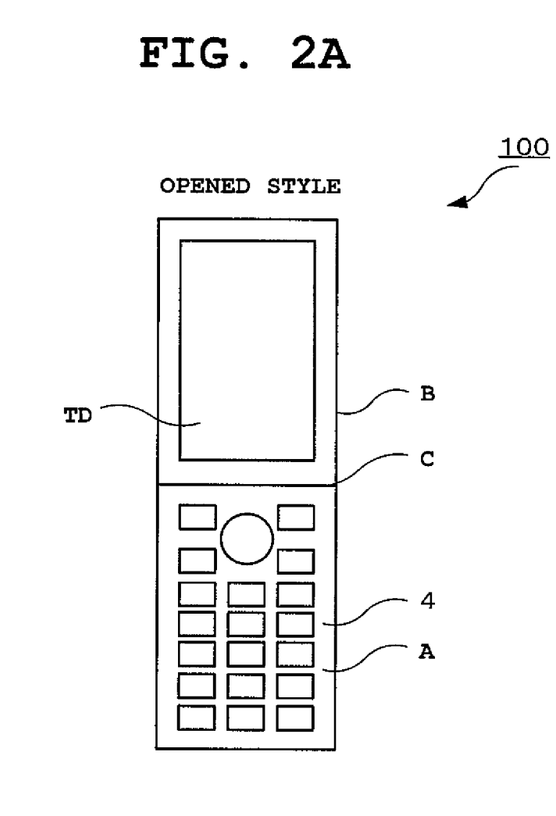
FIG. 2A is an outline view of a mobile phone shown in an opened style in which an operating section housing A and a display section housing B are in an unfolded state.
Figure 2B:
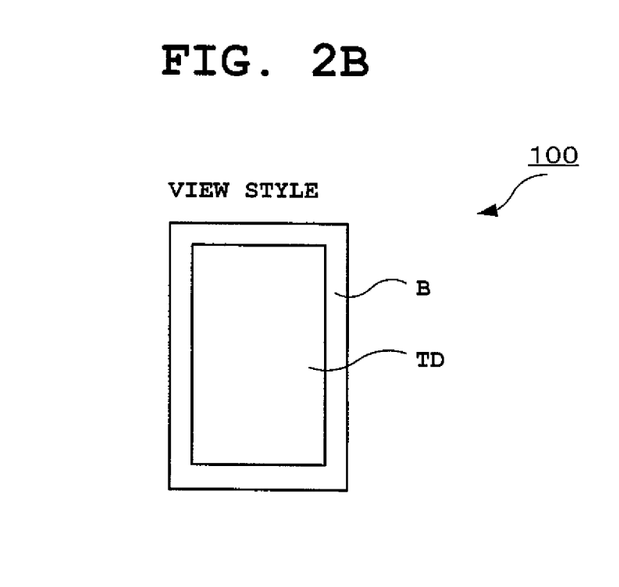
FIG. 2B is an outline view of the mobile phone shown in a view style in which the display section housing B has been rotated by 180 degrees in relation to the operating section housing A from the opened style and then folded in relation to the operating section housing A.

FIG. 2A and FIG. 2B are outline views of the mobile phone 100.

As shown in the diagrams, the mobile phone 100 is a two-shaft hinge type telephone device that is changeable to a plurality of styles corresponding to the connecting state of the plurality of housings constituting the device main body, and an operating section housing A and a display section housing B having a display section, which constitute the device main body, are foldably and rotatably connected via a hinge section C. The hinge section C is provided with an opening and closing hinge shaft to allow the operating section housing A and the display section housing B to be folded and unfolded. The hinge section C is also provided with a rotation hinge shaft in a position substantially perpendicular to the opening and closing hinge shaft in order to allow one housing to rotate in relation to the other housing. The operating section housing A and the display section housing B are foldably and rotatably connected via this hinge section C.

In a two-shaft hinge type mobile phone 100 such as this, the style of the mobile phone 100 is changeable to a plurality of styles (such as a closed style, an opened style, and a view style) corresponding to how the operating section housing A and the display section housing B are connected. FIG. 2A shows an opened style in which the operating section housing A and the display section housing B are in an unfolded state. The operating section 4 shown in FIG. 1 is arranged on the inner surface side of the operating section housing A, and the touch display TD shown in FIG. 1 is arranged on the inner surface side of the display section housing B. Accordingly, in the opened style, the operating section 4 and the touch display TD can be used, and display contents can be visually recognized. FIG. 2B shows a view style in which the display section housing B has been rotated by 180 degrees in relation to the operating section housing A from the opened style and then folded in relation to the operating section housing A. In the view style, although the operating section 4 is covered and hidden by the display section housing B, the touch display TD is in an exposed state.

Figure 3A:
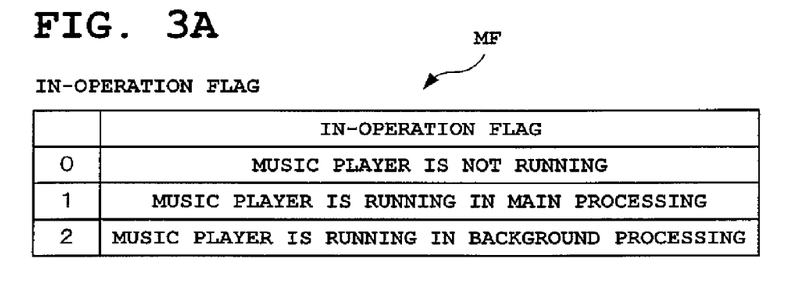
FIG. 3A to FIG. 3C are diagrams explaining a flag memory FM.
Figure 3B:
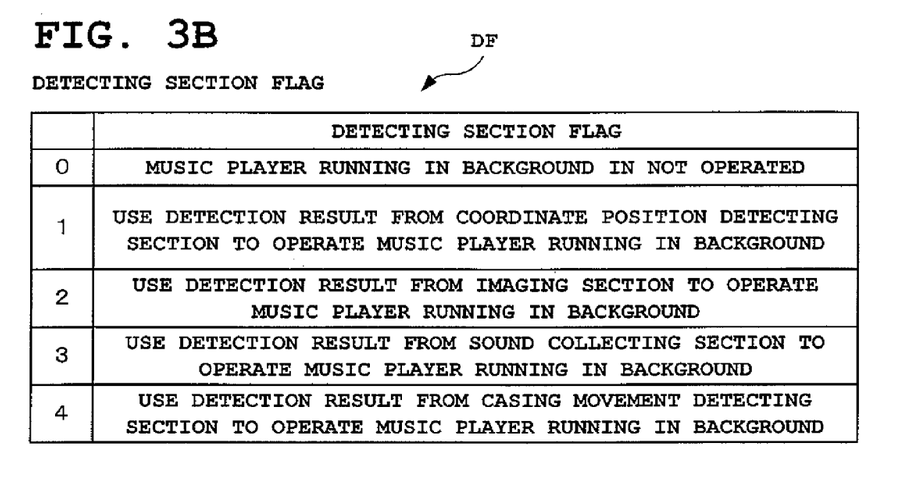
Figure 3C:
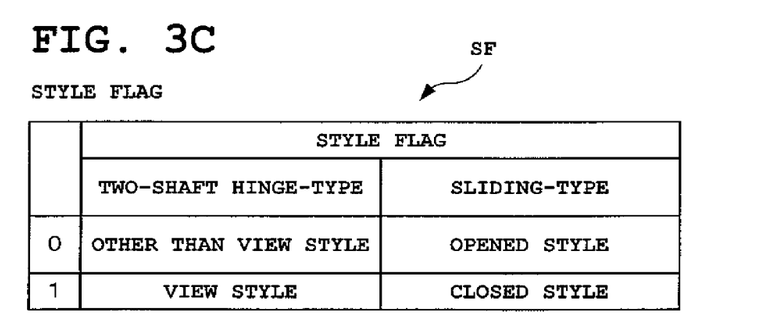

FIG. 3A to FIG. 3C are diagrams explaining the flag memory FM.

The flag memory FM stores an in-operation flag MF, a detecting section flag DF, and a style flag SF. FIG. 3A shows contents of the in-operation flag MF, FIG. 3B shows contents of the detecting section flag DF, and FIG. 3C shows contents of the style flag SF. The in-operation flag MF is a flag indicating the operation state of an audio-related function (audio-related application). That is, the in-operation flag MF is a flag indicating the operation state of the music player 7. As shown in FIG. 3A, when the in-operation flag MF is a value "0", the music player 7 is not running. When the in-operation flag MF is a value "1", the music player 7 is running in main processing (foreground processing). When the in-operation flag MF is a value "2", the music player 7 is running in background processing.

The detecting section flag DF is a flag that indicates, when the music player 7 is running in background processing, which operating means is used as the operating means for the background processing among various operating means in accordance with a user operation (touch, voice command, swing of housing, and gesture). That is, as shown in FIG. 3B, when the detecting section flag DF is a value "0", no operation is performed on the music player 7 that is running in the background processing. When the detecting section flag DF is a value "1", a detection result from the coordinate position detecting section 10 is used as the operating means for the music player 7 running in the background processing. When the detecting section flag DF is a value "2", a detection result from the imaging section 11 is used as the operating means for the music player 7 running in the background processing. When the detecting section flag DF is a value "3", a detection result from the sound collecting section 12 is used. When the detecting section flag DF is a value "4", a detection result from the housing movement detecting section 13 is used. The detecting section flag DF can be arbitrarily set by user operation.

The style flag SF indicates that the device main body is in a certain style in which the main operating section 4 cannot be used. As shown in FIG. 3C, when the style flag SF is a value "0", the device main body is in a style other than the view style (style other than the certain style). When the style flag SF is a value "1", the device main body is in the view style (certain style) in which the main operating section 4 cannot be used. In this embodiment, the present invention is applied to the two-shaft hinge-type mobile phone as an example. However, in the case of a sliding-type mobile phone that opens and closes by the display section housing B sliding over the operating section housing A, the main operating section 4 cannot be used in a closed state in which the display section housing B overlaps on the operating section housing A. Therefore, when the style flag SF is the value "0", the device main body is in an opened state in which the operating section housing A and the display section housing B are opened. When the style flag SF is the value "1", the device main body is in the closed state.

Figure 4:
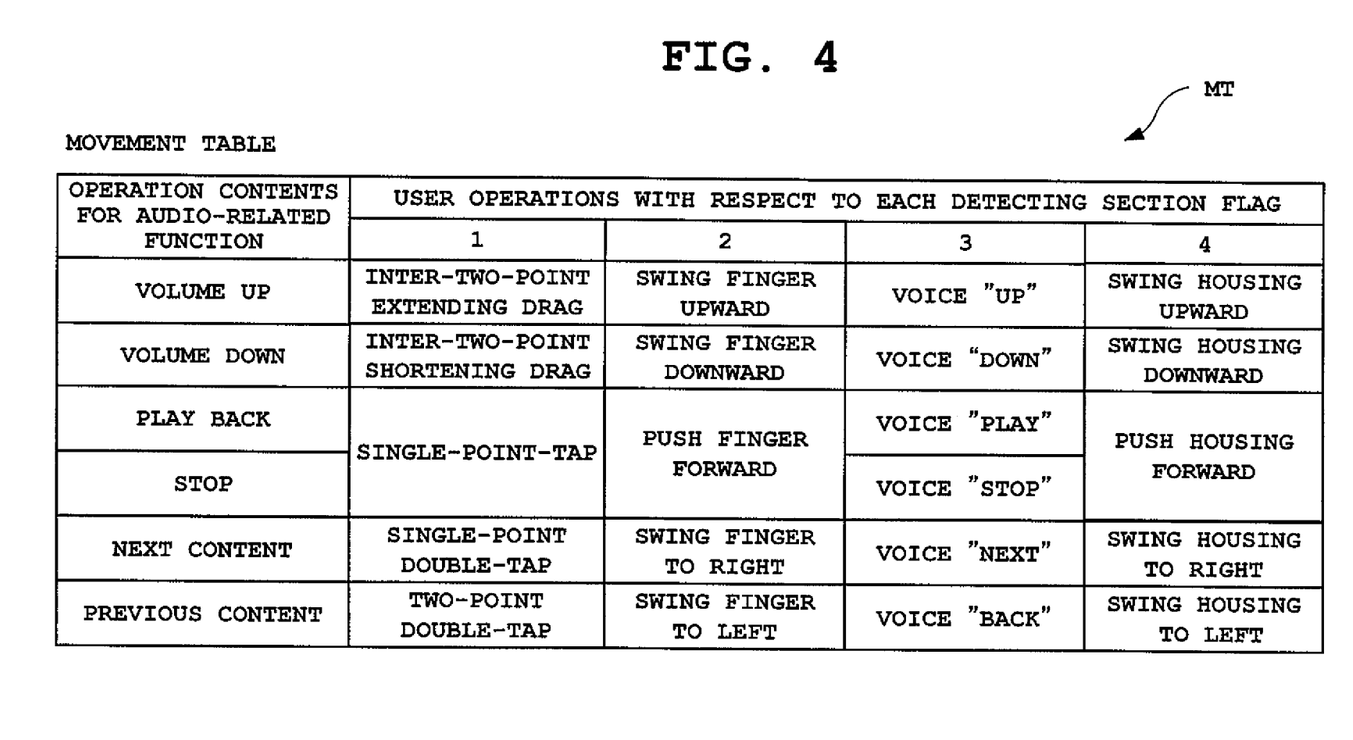
FIG. 4 is a diagram explaining an operation table MT.

FIG. 4 is a diagram explaining the operation table MT.

In FIG. 4, the operation table MT is a table defining each operating means corresponding to various user operations (touch, voice command, swing of housing, and gesture) as an operating means for an audio-related function (audio-related application) running in background processing. This operation table MT includes fields of "operation contents for audio-related function" and "user operations with respect to each detecting section flag". Here, "inter-two-point extending drag", "inter-two-point shortening drag", "single-point tap", "single-point double tap", and "two-point double tap" have been set for the "user operation" when the detecting section flag DF is "1". The "inter-two-point extending drag" is a touch operation in which two fingers are dragged on the touch display TD such that the fingers gradually move farther apart from each other, and "volume up" instructing the increase of a set volume of the music player 7 has been set as a "operation content" corresponding to this touch operation.

The "inter-two-point shortening drag" is a touch operation in which two fingers are dragged on the touch display TD such that the fingers gradually move closer to each other, and "volume down" instructing the decrease of a set volume of the music player 7 has been set as a "operation content" corresponding to this touch operation. The "single-point tap" is a touch operation in which a single point on the touch display TD is touched once, and "playback" and "stop" have been set as a "operation content" corresponding to this touch operation. When the "single-point tap" is performed while the music player 7 is stopped, the music player 7 is instructed to perform playback. When the "single-point tap" is performed while the music player 7 is playing, the music player 7 is instructed to "stop" playback. The "single-point double tap" is a touch operation in which a single point on the touch display TD is consecutively touched twice, and "next content" for designating the next music content as a playback subject has been set as a "operation content" corresponding to this touch operation. The "two-point double tap" is a touch operation in which two points on the touch display TD are consecutively touched twice, and "previous content" for designating the previous music content as a playback subject has been set as a "operation content" corresponding to this touch operation.

Also, "swing finger upward", "swing finger downward", "push finger forward", "swing finger to the right", and "swing finger to the left" have been set for the "user operation" when the detecting section flag DF is "2", and "volume up", "volume down", "playback"/"stop", "next content", and "previous content" have been set as "operation contents" corresponding to these operations. Here, "playback" and "stop" have been set as "operation contents" corresponding to "push finger forward", and when the operation "push finger forward" is performed while the music player 7 is stopped, the music player 7 is instructed to perform playback. When the operation "push finger forward" is performed while the music player 7 is playing, the music player 7 is instructed to "stop" playback.

Moreover, "voice (up)", "voice (down)", "voice (play)", "voice (stop)", "voice (next)", and "voice (back)" have been set for the "user operation" when the detecting section flag DF is "3", and "volume up", "volume down", "playback", "stop", "next content", and "previous content" have been set as "operation contents" corresponding to these operations. Furthermore, "swing housing upward", "swing housing downward", "push housing forward", "swing housing to the right", and "swing housing to the left" have been set for the "user operation" when the detecting section flag DF is "4", and "volume up", "volume down", "playback"/"stop", "next content", and "previous content" have been set as "operation contents" corresponding to these operations. Here, "playback" and "stop" have been set as "operation contents" corresponding to "push housing forward", and when the operation "push housing forward" is performed while the music player 7 is stopped, the music player 7 is instructed to perform playback. When the operation "push housing forward" is performed while the music player 7 is playing, the music player 7 is instructed to "stop" playback.

FIG. 5A to FIG. 5D are diagrams showing display examples of images displayed in the display section 9 while an application is running.

Figure 5A:
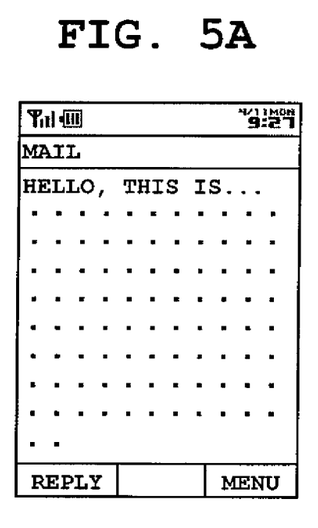
FIG. 5A is a diagram showing a display example of when a mail function is running in main processing.

FIG. 5A is a diagram showing a display example of when an application (mail function) other than the music player 7 is running in main (foreground) processing in a style other than the view style in which the touch display TD is exposed. In this instance, in addition to the main operating section 4, each operating means based on various user operations (touch, voice command, swing of housing, and gesture) can be used as an operating means for the application (mail function) running in the main processing. In this diagram, "mail" indicates that the mail function is running in the main processing.

Figure 5B:
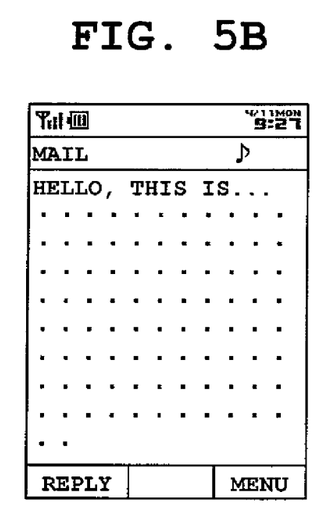
FIG. 5B is a diagram showing a display example of when a music player 7 is running in the background while the main function is running in the main processing.

FIG. 5B is a diagram showing a display example of when an application (mail function) other than the music player 7 is running in main (foreground) processing while the music player 7 is running in the background processing in a style other than the view style in which the touch display TD is exposed. In this instance, a musical note symbol in the diagram indicates that the music player 7 is running in the background processing, and the whole area of the touch display TD is assigned as the operating means for the music player 7 running in the background processing. Note that FIG. 5B is the same as FIG. 5A except for the musical note symbol.

Figure 5C:
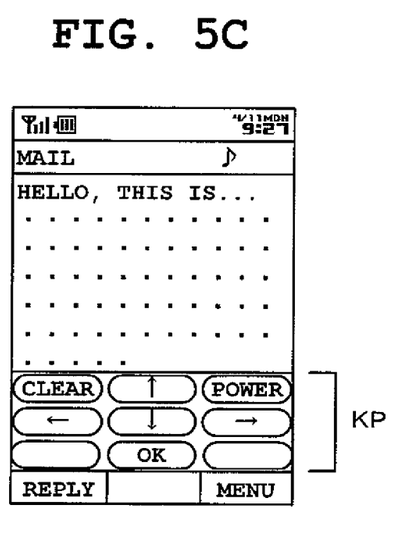
FIG. 5C is a diagram showing a display example of when the music player 7 is running in the background while the mail function is running in the main processing in the view style.

FIG. 5C is a diagram showing a display example of when an application (mail function) other than the music player 7 is running in main (foreground) processing and the music player 7 is running in the background processing in the view style. In this instance, a key operation panel KP is provided within the touch display TD as an operating screen for the main processing, and various touch keys (software keys) are arranged on the key operation panel KP. When any of the touch keys within the key operation panel KP is touched, the control section 1 performs processing corresponding to the key operation signal. In this instance, the whole area of the touch display TD excluding the key operation panel KP is assigned as the operating means for the music player 7 running in the background processing.

That is, in a state where the operating screen (key operation panel KP) used for a function running in main processing is arranged in a portion of the touch display TD, when a touch operation detected by the coordinate position detecting section 10 is an operation performed on the key operation panel KP, this touch operation is assigned to the function running in the main processing. When the touch operation is an operation performed on another portion of the touch display TD, this touch operation is assigned to the music player 7 running in the background processing.

Figure 5D:
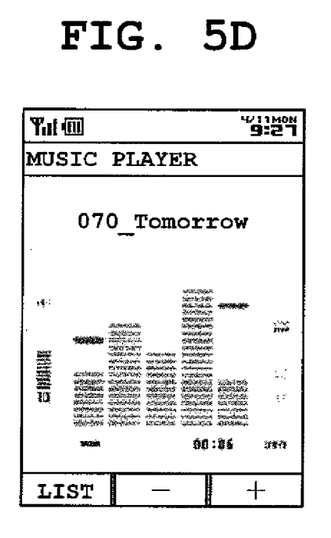
FIG. 5D is a diagram showing a display example when the music player 7 is running in the main processing.

FIG. 5D is a diagram showing a display example of when the music player 7 is running in main processing in a style other than the view style in which the touch display TD is exposed. In this instance, in addition to the main operating section 4, each operating means based on various user operations (touch, voice command, swing of housing, and gesture) can be used as an operating means for the application (music playback function) running in the main processing. In the example shown in the diagram, the touch display TD is a graphic equalizer screen of which the display state changes corresponding to the progression of the music.

Here, the control section 1 actualizes functions of a operation detecting means, an operation state judging means, a controlling means, and an operating section status judging means.

Next, an operating concept of the mobile phone 100 according to the embodiment will be described with reference to the flowcharts shown in FIG. 6 to FIG. 10.

Each function described in the flowcharts is stored in a readable program code format, and operations are sequentially performed in accordance with these program codes. In addition, operations in accordance with the program codes transmitted from a transmission medium can also be sequentially performed. That is, operations unique to the embodiment can be performed using programs and data provided from an external source via a transmitting medium, in addition to a recording medium.

FIG. 6 to FIG. 9 are flowcharts showing an overview of overall operations of the mobile phone 100 that start when power is turned ON. The operations in these flowcharts are executed by the control section 1.

In FIG. 6 to FIG. 9, first, the control section 1 performs initialization processing such as clearing a predetermined memory (Step A1 in FIG. 6), and then enters an idle state awaiting an incoming call or the like (Step A2). In the idle state, the control section 1 judges whether or not an incoming call has been received via the communicating section 5 (Step A3). When judged that an incoming call has not been received, the control section 1 judges, based on a detection result from the style detecting section 14, whether or not a style change operation has been performed (Step A13).

Figure 6:
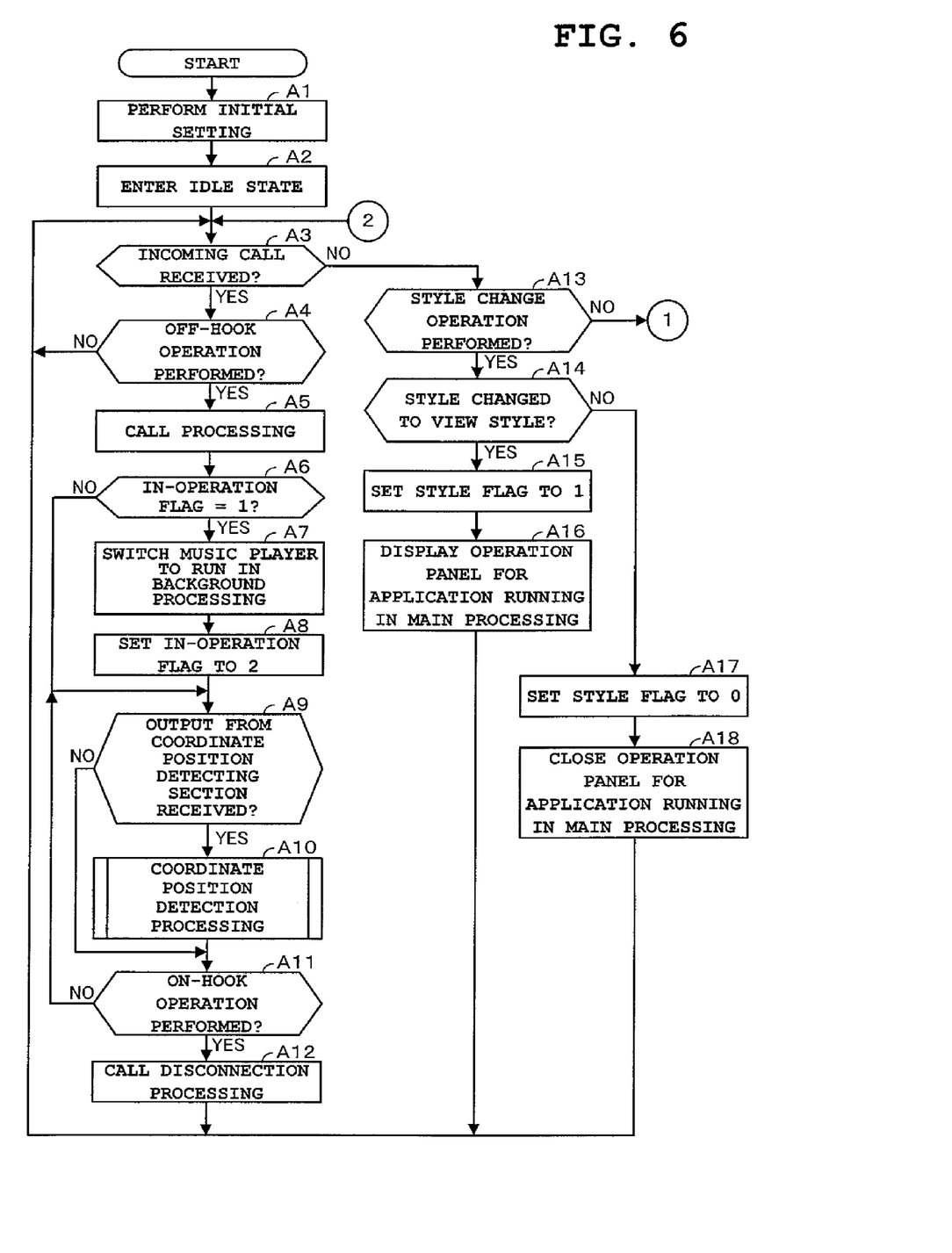
Figure 7:
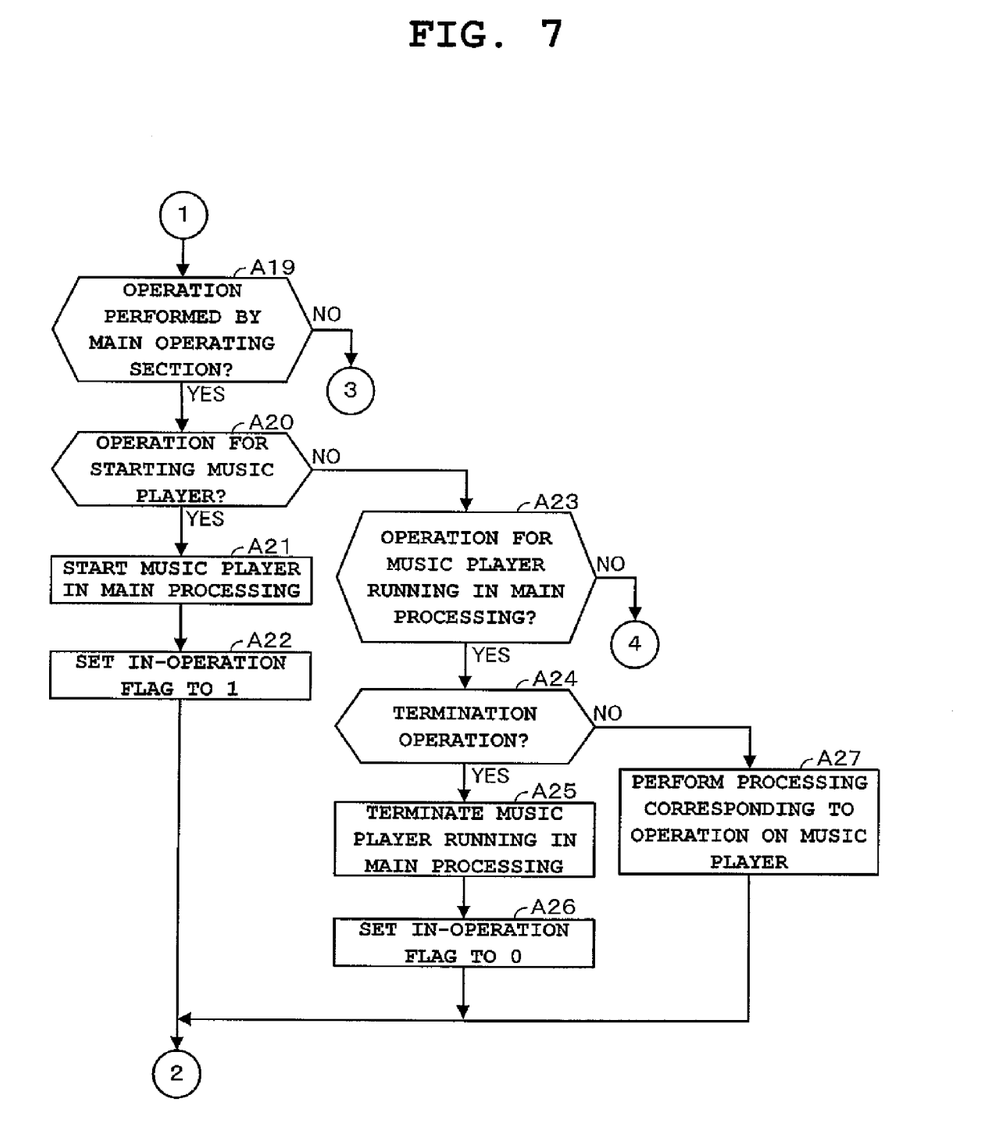
FIG. 7 is a flowchart of operations subsequent to those in FIG. 6.

When judged that a style change operation has not been performed (NO at Step A13), the control section 1 proceeds to the processing flow in FIG. 7, and judges whether or not an operation from the main operating section 4 has been performed (Step A19). When judged that an operation from the main operating section 4 has been performed and further judged that the operation is an operation instructing the start-up of the music player 7 (YES at Step A20), the control section 1 starts up the music player 7 in the main processing (Step A21) and sets the in-operation flag MF to "1" to indicate that the music player 7 is running in the main processing (Step A22). In this case, the display content of the touch display TD is as shown in FIG. 5D. Then, the control section 1 returns to Step A3 in FIG. 6.

In such a state where the music player 7 is running in the main processing, when judged that an operation from the main operating section 4 has been performed (YES at Step A19) and further judged that the operation is to be performed on the music player 7 running in the main processing (YES at Step A23), the control section 1 judges whether or not the operation is for terminating the operation of the music player 7 (Step A24). When judged that the operation is another operation (NO at Step A24), the control section 1 performs processing corresponding to this operation, such as volume adjustment processing or content change processing, on the music player 7 (Step A27). When judged that the operation is for terminating the operation of the music player 7 (YES at Step A24), the control section 1 terminates the operation of the music player 7 and sets the in-operation flag MF to "0" (Step A26).

Figure 8:
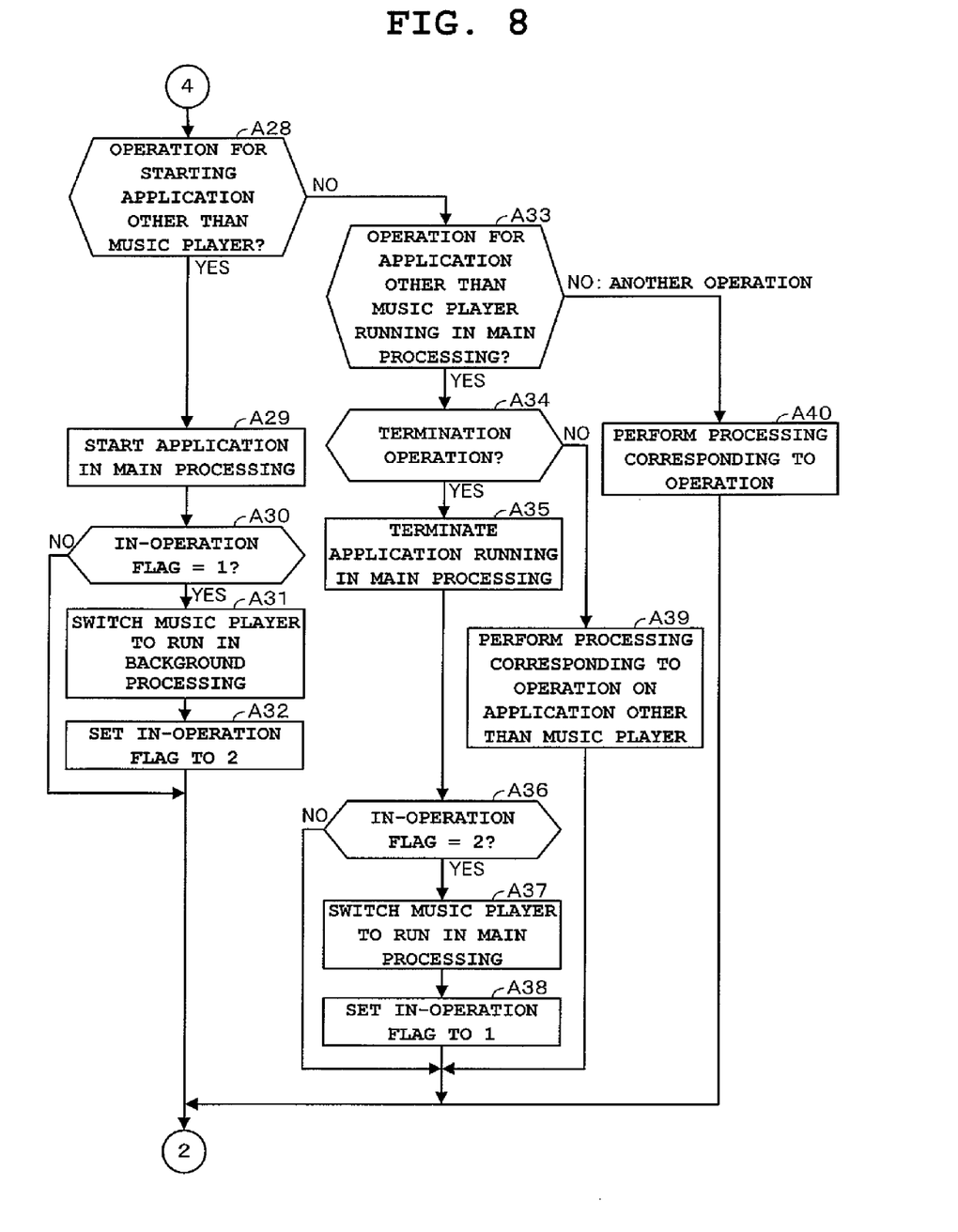
FIG. 8 is a flowchart of operations subsequent to those in FIG. 7.

When judged that the operation from the main operating section 4 is not an operation to be performed on the music player 7 running in the main processing (NO at Step A23), the control section 1 proceeds to the processing flow in FIG. 8, and judges whether or not the operation is an operation instructing the start-up of an application other than the music player 7 (Step A28). When judged that the operation is an operation instructing the start-up of an application other than the music player 7, the control section 1 starts up the instructed application in the main processing (Step A29). In this case, the display content of the touch display TD is as shown in FIG. 5A. Then, the control signal 1 judges whether or not the in-operation flag MF is "1" (Step A30).

When judged that the in-operation flag MF is not "1" or, in other words, when the music player 7 is not running in the main processing (NO at Step A30), the control section 1 returns directly to Step A3 in FIG. 6. When judged that the in-operation flag MF is "1" and the music player 7 is operating in the main processing (YES at Step A30), the control section 1 switches the music player 7 running in the main processing to run in the background processing (Step A31). In this case, the display content of the touch display TD is as shown in FIG. 5B. Then, the control section 1 sets the in-operation flag MF to "2" (Step A32) and returns to Step A3 in FIG. 6.

In such a state where an application other than the music player 7 is running in the main processing, when judged that an operation from the main operating section 4 has been performed (Yes at Step A19 in FIG. 7), the control section 1 determines the type of the operation at Step A20, Step A23, and Step A28 described above. When judged that the operation is another operation (NO at Step A28), the control section 1 judges whether or not this operation is an operation to be performed on the application other than the music player 7 running in the main processing (Step A33). When judged that the operation is not an operation to be performed on the application and is, for example, a power OFF operation, the control section 1 performs processing corresponding to this operation (Step A40) and returns to Step A3 in FIG. 6.

When judged that the operation from the main operating section 4 is an operation to be performed on the application other than the music player 7 running in the main processing (YES at Step A33), the control section 1 judges whether or not the operation is for terminating the operation of the application (Step A34). When judged that the operation is another operation (NO at Step A34), the control section 1 performs processing corresponding to this operation on the application (Step A39). When judged that the operation is for terminating the operation of the application (YES at Step A34), the control section 1 terminates the operation of the application running in the main processing (Step A35). In this case, when the in-operation flag MF is not "2" or, in other words, the music player 7 is not running in the background processing (NO at Step A36), the control section 1 returns directly to Step A3 in FIG. 6. When the music player 7 is running in the background processing (YES at Step A36), the control section 1 switches the music player 7 running the background processing to run in the main processing (Step A37). The control section 1 then sets the in-operation flag MF to "1" (Step A38) and returns to Step A3 in FIG. 6.

On the other hand, when judged that a style change operation has been performed (YES at Step A13 in FIG. 6) and further judged that the style has been changed to the view style (YES at Step A14), the control section 1 sets the style flag SF to "1" (Step A15). Then, the control section 1 arranges the key operation panel KP on the touch display TD, and assigns this key operation panel KP as an operating means for the application running in the main processing (Step A16). In this case, the display content of the touch display TD is as shown in FIG. 5C. When judged that the style has not been changed to the view style (NO at Step A14), the control section 1 changes the style flag SF to "0" (Step A17), and then closes the key operation panel KP on the touch display TD (Step A18).

Here, when judged that an incoming call has been received (YES at Step A3), in response to an off-hook operation for connecting the call (YES at Step A4), the control section 1 performs call processing that allows communication (Step A5). Then, the control section 1 judges whether or not the value of the in-operation flag MF during the call is "1" or, in other words, whether or not the music player 7 is running in the main processing (Step A6). When judged that the in-operation flag MF is not "1", and the music player 7 is not running or is running in the background processing (No at Step A6), the control section 1 proceeds to Step A9 described hereafter.

When judged that the in-operation flag MF is "1" and the music player 7 is running in the main processing (YES at Step A6), the control section 1 switches the music player 7 running in the main processing to run the background processing (Step A7) and sets the in-operation flag MF to "2" (Step A8). Then, the control section 1 proceeds to subsequent Step A9 and judges whether or not a touch operation has been performed based on whether or not an output from the coordinate position detecting section 10 has been received. When judged that a touch operation has been performed (YES at Step A9), the control section 1 proceeds to coordinate position detection processing (Step A10), described hereafter. Subsequently, until an on-hook operation for disconnecting the call is performed (NO at Step A11), the control section 1 returns to Step A9 described above. When an on-hook operation is performed (YES at Step A11), the control section 1 performs call disconnection processing (Step A12) and returns to Step A3, described above.

Figure 9:
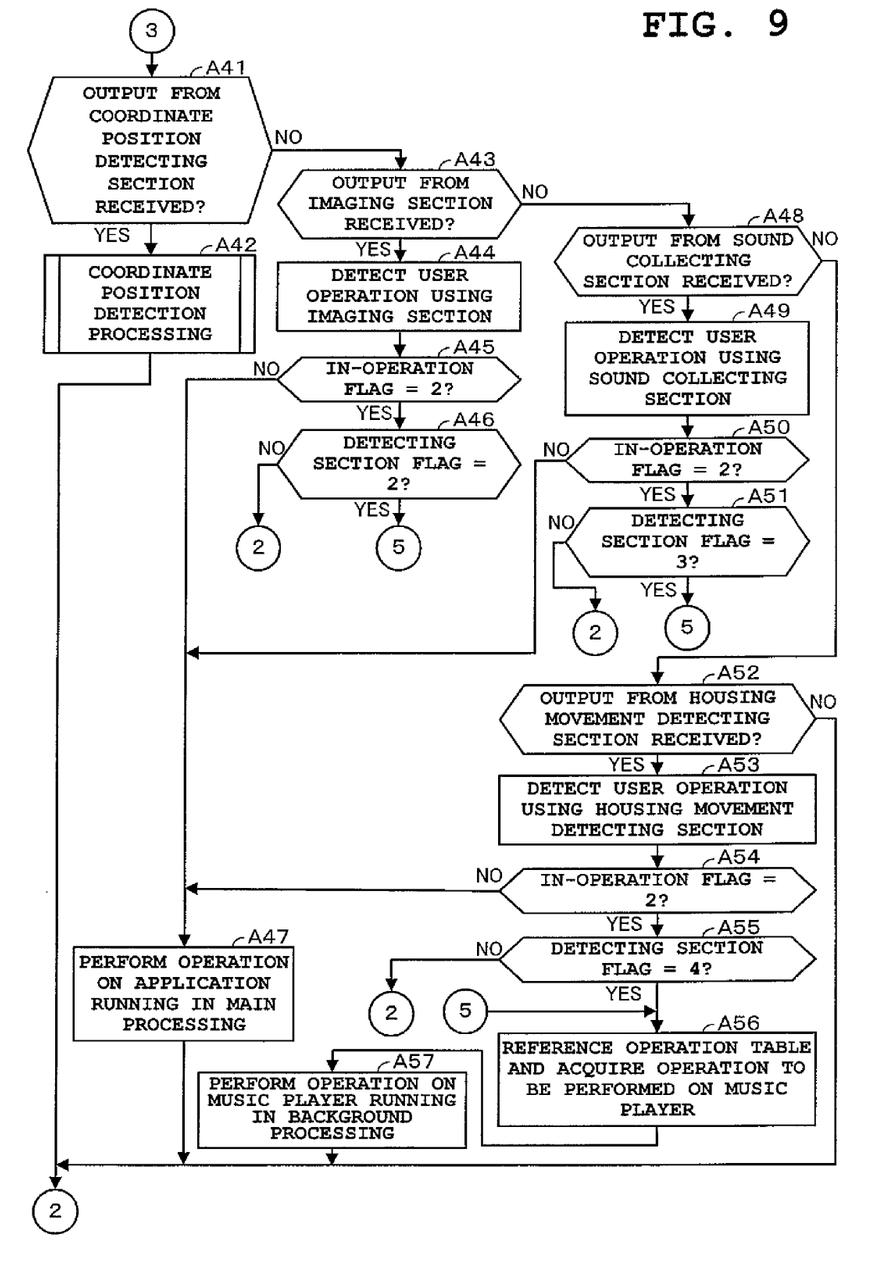
FIG. 9 is a flowchart of operations subsequent to those in FIG. 7.
Figure 10:
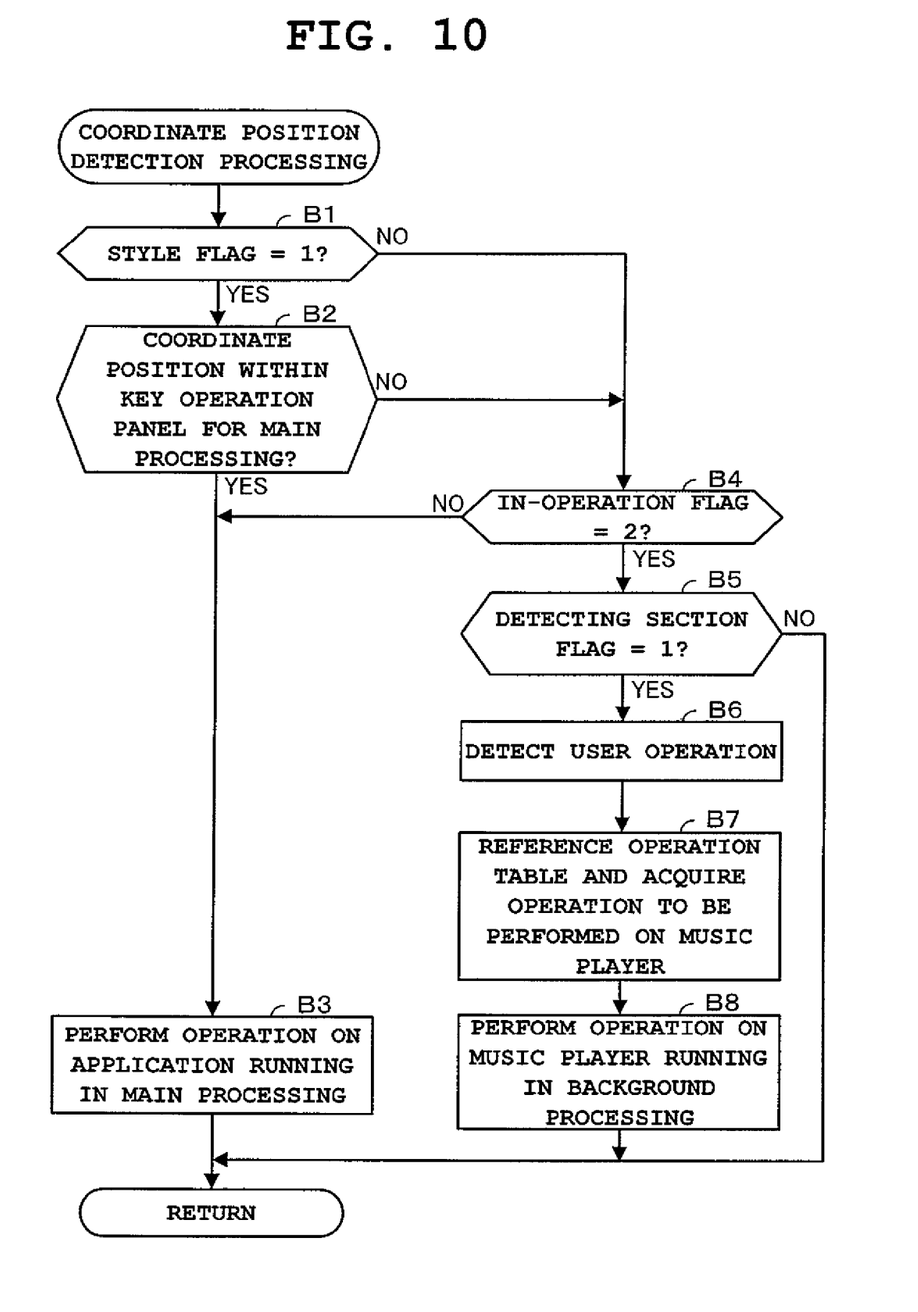
FIG. 10 is a flowchart showing details of coordinate position detection processing (Step A10 in FIG. 6, Step A42 in FIG. 9, etc.) performed in response to a touch operation.

FIG. 10 is a flowchart showing details of the coordinate position detection processing (Step A10 in FIG. 6 and Step A42 in FIG. 9) performed in response to a touch operation.

In FIG. 10, first, the control section 1 references the style flag SF, and judges whether or not the value thereof is "1" (view style) (Step B1). When judged that the style is the view style, the control section 1 judges whether or not a coordinate position within the key operation panel KP shown in FIG. 5C has been touched or, in other words, whether or not a touch key arranged within the main key operation panel KP has been operated (Step B2). When judged that the touch key has been operated, the control section 1 performs an operation corresponding to the touch key on the application running in the main processing (Step B3).

When judged that an area other than the key operation panel KP for the main processing has been touched in the view style (NO at Step B2), the control section 1 references the in-operation flag MF, and judges whether or not the value thereof is "2" (whether or not the music player 7 is running in the background processing) (Step B4). When judged that the value is not "2", the control section 1 performs predetermined processing corresponding to this touch operation on the application running in the main processing (Step B3). For example, when the two-point double tap is performed on the touch display TD shown in FIG. 5A, the control section 1 performs processing for terminating the mail function running in the main processing.

When judged that the in-operation flag MF is "2" and the music player 7 is running in the background processing in the view style (YES at Step B4), the control section 1 references the detecting section flag DF, and judges whether or not the value thereof "1" or, in other words, whether or not a detection result from the coordinate position detecting section 10 has been specified to be used as an operating means for the music player 7 running in the background processing (Step B5). When judged that the value of the detecting section flag DF is not "1", the control section 1 exits the processing flow in FIG. 10 at this point. When judged that the value is "1" (YES at Step B5), the control section 1 detects the user's operation based on how the touch operation has been performed (Step B6).

That is, the control section 1 detects the user's operation based on whether the touch operation is the "inter-two-point extending drag", the "inter-two-point shortening drag", the "single-point tap", the "single-point double tap", or the "two-point double tap". Then, the control section 1 references the operation table MT based on the detected user operation, and after acquiring an "operation content" corresponding to the detected user operation when the detecting section flag DF is "1" (Step B7), performs processing corresponding to the "operation content" on the music player 7 running in the background processing (Step B8). For example, the control section 1 performs processing for increasing the volume by a single step based on the "inter-two-point extending drag", and performs processing for starting a playback operation based on the "single-point tap".

When judged that the style flag SF is not "1" or, in other words, the touch operation has been performed in a style (such as the opened style) other than the view style in which the touch display TD is exposed (NO at Step B1), the control section 1 proceeds to Step B4 described above, and performs the same processing thereafter. That is, on the condition that the music player 7 is running in background processing (YES at Step B4) and a detection result from the coordinate position detecting section 10 has been specified to be used as an operating means for the music player 7 (YES at Step B5), the control section 1 detects the user's operation based on how the touch operation has been performed, and performs processing in accordance with the corresponding "operation content" on the music player 7 that is running in the background processing (Step B6 to Step B8).

On the other hand, when judged that an operation from the main operating section 4 has not been performed (NO at Step A19 in FIG. 7), the control section 1 returns to the flow in FIG. 9 and judges whether or not a touch operation has been performed based on whether or not a key operation signal has been outputted from the coordinate position detecting section 10 (Step A41). When judged that a touch operation has been performed, the control section 1 proceeds to the coordinate position detection processing described above (Step A42), and performs the operation of the application running in the main processing or the operation of the music player 7 running in the background processing as an operation in accordance with the touch input.

When an output from the imaging section 11 is detected (YES at Step A43), the control section 1 analyzes the image picked up by the imaging section 11 and detects a user operation (gesture) such as "swing finger upward" or "swing finger to the right" (Step A44). Then, the control section 1 judges whether or not the value of the in-operation flag MF is "2" (whether or not the music player 7 is running in the background processing) (Step A45). When judged that the value is not "2", the control section 1 performs processing corresponding to this user operation (gesture) on the application running in the main processing (Step A47), and then returns to Step A3 in FIG. 6.

When judged that the in-operation flag MF is "2" and further judged that the music player 7 is running in the background processing (YES at Step A45), the control section 1 references the detecting section flag DF and judges whether or not the value is "2" or, in other words, whether or not a detection result from the imaging section 11 has been specified to be used as an operating means for the music player 7 running in the background processing (Step A46).

When judged that the detecting section flag DF is not "2" (NO at Step A46), the control section 1 returns to Step A3 in FIG. 6. When judged that the detecting section flag DF is "2" (YES at Step A46), the control section 1 references the operation table MT based on the user operation (gesture) detected as described above, and acquires an "operation content" corresponding to the detected user operation when the detecting section flag DF is "2" (Step A56). Then, the control section 1 performs processing corresponding to the "operation content" on the music player 7 running in the background processing (Step A57). For example, the control section 1 performs processing for increasing the volume by a single step in accordance with "swing finger upward", and performs processing for changing the playback subject to the previous content in accordance with "swing finger to the right".

When an output from the sound collecting section 12 is detected (YES at Step A48), the control section 1 analyzes (performs voice recognition on) the inputted audio from the sound collecting section 12, and detects a voice command such as "up", "play", and "stop" as a user operation (Step A49). Then, the control section 1 judges whether or not the value of the in-operation flag MF is "2" (whether or not the music player 7 is running in the background processing) (Step A50). When judged that the value is not "2", the control section 1 performs processing corresponding to this user operation (voice command) on the application running in the main processing (Step A47), and then returns to Step A3 in FIG. 6.

When judged that the in-operation flag MF is "2" and further judged that the music player 7 is running in the background processing (YES at Step A50), the control section 1 references the detecting section flag DF and judges whether or not the value of the detecting section flag DF is "3" or, in other words, whether or not a detection result from the sound collecting section 12 has been specified to be used as an operating means for the music player 7 running in the background processing (Step A51). When judged that the detecting section flag DF is not "3" (NO at Step A51), the control section 1 returns to Step A3 in FIG. 6. When judged that the detecting section flag DF is "3" (YES at Step A51), the control section 1 references the operation table MT based on the user operation (voice command) detected as described above, and acquires an "operation content" corresponding to the detected user operation when the detecting section flag DF is "3" (Step A56). Then, the control section 1 performs processing corresponding to the "operation content" on the music player 7 running in the background processing. (Step A57). For example, the control section 1 performs processing for increasing the volume by a single step in accordance with "up", and performs processing for starting a playback operation in accordance with "play".

When an output from the housing movement detecting section 13 is detected (YES at Step A52), the control section 1 detects, based on a detection result from the housing movement detecting section 13, a swing direction of the device main body as a user operation (Step A53). For example, the control section 1 detects "swing housing upward", "swing housing downward", and "push housing forward". Then, the control section 1 judges whether or not the value of the in-operation flag MF is "2" (whether or not the music player 7 is running in the background processing) (Step A54). When judged that the value is not "2", the control section 1 performs processing corresponding to this user operation (swing direction) on the application running in the main processing (Step A47), and then returns to Step A3 in FIG. 6.

When judged that the in-operation flag MF is "2" and further judged that the music player 7 is running in the background processing (YES at Step A54), the control section 1 references the detecting section flag DF and judges whether or not the value is "4" or, in other words, whether or not a detection result from the housing movement detecting section 13 has been specified to be used as an operating means for the music player 7 running in the background processing (Step A55). When judged that the detecting section flag DF is not "4" (NO at Step A55), the control section 1 returns to Step A3 in FIG. 6.

When judged that the detecting section flag DF is "4" (YES at Step A55), the control section 1 references the operation table MT based on the user operation (swing direction) detected as described above, and acquires an "operation content" corresponding to the detected user operation when the detecting section flag DF is "4" (Step A56). Subsequently, the control section 1 performs processing corresponding to the "operation content" on the music player 7 running in the background processing (Step A57). For example, the control section 1 performs processing for increasing the volume by a single step in accordance with "swing housing upward", and performs processing for reducing the volume by a single step in accordance with "swing housing downward". Then, the control section 1 returns to Step A3 in FIG. 6.

As described above, according to the embodiment, when an audio-related function is running in background processing in parallel with a function running in the main processing (foreground processing) where operations by the main operating section 4 have been assigned to the function running in the main processing, the audio-related function running in the background processing can be operated, without an operating section dedicated to the audio-related function being provided, by the control section 1 based on a user operation. Thus, the present invention is highly effective in practical use.

In addition, the following effects are achieved.

According to the present invention, when an audio-related function is running in background processing, display by the display section 9 and operation by the main operating section 4 are assigned to the function running in the foreground processing. Therefore, even when the audio-related function is running in the background processing, the display section 9 and the main operating section 4 can be used for the function running in the main processing.

In addition, the coordinate position detecting section 10 constituting the touch display TD detects, as a user operation, a coordinate input operation (touch operation) in which the coordinate position on the touch display TD (display 9) is inputted. Therefore, the operation of an audio-related function running in background processing can be performed by an input operation of a coordinate position. In addition, the existing touch display TD can be used as an operating means for the audio-related function.

Moreover, when the main operating section 4 cannot be used, such as when the device main body is in the view style, the coordinate input operation detected by the coordinate position detecting section 10 is assigned to the function running in the foreground processing even while an audio-related function is running in the background processing. Therefore, the function running in the main processing can be operated via the coordinate position detecting section 10 even when the main operating section 4 cannot be used.

Furthermore, when the main operating section 4 cannot be used, if the coordinate input operation detected by the coordinate position detecting section 10 is performed on the operating screen (key operation panel KP) used for a function running in main processing which is provided in a portion of the display section 9, this coordinate input operation is assigned to the function running in the main processing. When the coordinate input operation is performed on other areas of the display section 9, this coordinate input operation is assigned to an audio-related function running in the background processing. Therefore, both the function running in the main processing and the audio-related function running in the background processing can be operated even when the main operating section 4 cannot be used.

Still further, since the overall area of the touch screen TD is assigned for an audio-related function, the operation of an audio-related function running in background processing can be performed without the user viewing the display content.

Yet still further, an image of the user picked up by the imaging section 11 is analyzed, and the analysis result is detected as a user operation. Therefore, the operation of an audio-related function running in background processing can be performed by the user moving a finger or the like, and the type of operation can be changed by changing how the user moves his finger. In addition, the existing imaging section 11 which provides the camera function can be used as an operating means for an audio-related function.

Yet still further, a voice (sound) from the user collected by the sound collecting section 12 is recognized, and the recognition result is detected as a user operation. Therefore, the operation of an audio-related function running in background processing can be performed by the user's voice or tapping sounds, and the type of operation can be changed by changing how or what the user speaks or by changing how the user taps. In addition, the existing sound collecting section 12 which provides the recording function can be used as an operating means for an audio-related function.

Yet still further, when the device main body is swung, the housing movement detecting section 13 detects the swinging operation as a user operation. Therefore, the operation of an audio-related function running in background processing can be performed by the terminal device being swung, and the type of operation can be changed by changing how the terminal device is swung. In addition, the existing housing movement detecting section 13 which provides the pedometer function can be used as an operating means for an audio-related function.

In the above-described embodiment of the present invention, the music player 7 is given as an example of the audio-related function provided in the mobile phone. However, the audio-related function is not limited thereto and may be, for example, an alarm function, a radio function, or a mail reader function.

In addition, in the above-described embodiment, the touch display TD constituted by the display section 9 and the coordinate position detecting section 10 is given as an example of a means for detecting, as a user operation, the coordinate input operation in which a coordinate position on the display 9 is inputted. However, coordinate inputting means such as a touch pad or a track ball may be used.

Moreover, in the above-described embodiment, a case where the present invention is applied to a two-shaft hinge-type mobile phone is described. However, the present invention is not limited to the above-described embodiment. The present invention may be applied to, in addition to the above-mentioned sliding-type mobile phone, a two-way open-style mobile phone in which the opened style can be switched between a vertical opened state where the display section housing is opened in a vertical direction in relation to the operating section housing and a horizontal opened state where the display section housing is opened in a horizontal direction in relation to the operating section housing, or the like.

Furthermore, the present invention may be applied to, in addition to mobile phones, other terminal devices such as a personal digital assistant (PDA), a digital camera, an electronic wristwatch, a music player, and the like.

While the present invention has been described with reference to the preferred embodiments, it is intended that the invention be not limited by any of the details of the description therein but includes all the embodiments which fall within the scope of the appended claims.

What is claimed is:

1. A terminal device having a display section including a touch screen and a key operating section that performs a plurality of input operations, the terminal device being configured to run in parallel a plurality of functions including an audio-related function, comprising:

a first storage means for storing, with respect to each of a plurality of operating means, including operation of the touch screen, a gesture, a voice command and a swing operation, other than operation from the key operating section, which is assignable when the audio-related function runs in a background process, operations performed by a user with each of the plurality of operating means in association with a plurality of operational contents for the audio-related function, respectively;

a second storage means for storing an operating means set in advance by the user among the plurality of operating means as an operating means to be assigned when the audio-related function runs in the background process;

a first judging means for judging whether the audio-related function is running in the background process in parallel with a function running in a foreground process;

a first controlling means for, when the first judging means judges that the audio-related function is running in the background process, automatically controlling to assign display outputs to the display section and operation inputs from the key operating section to the function running in the foreground process;

an operation detecting means for detecting an operation performed by a user other than the operation from the key operating section;

an identifying means for specifying an operating means from the operation detected by the operation detecting means;

a second judging means for, when the first judging means judges that the audio-related function is running in the background process, judging whether the operation means identified by the identifying means coincides with the operation means stored by the second storage means;

an acquisition means for, when the operation means identified by the identifying means coincides with the operation means stored by the second storage means, acquiring an operational content for the audio-related function associated with the operation detected by the operation detecting means from the first storage means; and a controlling means for instructing the audio-related function running in the background process to perform the operational content acquired by the acquisition means;

wherein, when judged that the operation means identified by the identifying means coincides with the operation means stored by the second storage means and is touch screen operations, the operating detecting means detects as a user an operation pattern of the touch screen operation which has been performed in the display section including the touch screen; and wherein the acquisition means acquires an operational content for the audio-related function associated with the operation pattern of the touch screen operation detected by the operation detecting means, among the plurality of operational contents for the audio-related function stored by the first storage means.

2. The terminal device according to claim 1, wherein the operation detecting means, when judged that the operation means identified by the identifying means coincides with the operation means stored by the second storage means and is gesture, detects an operation pattern of the gesture as the user operation based on an analysis result of a captured image of the user; and wherein the acquisition means acquires for the audio-related function associated with the operation pattern of the gesture detected by the operation detecting means, among the plurality of operational contents for the audio-related function stored by the first storage means.

3. The terminal device according to claim 1,
wherein the operation detecting means, when judged that the operation means identified by the identifying means coincides with the operation means stored by the second storage means and is voice command, detects an operation pattern of the voice command as the user operation based on a recognition result recognized by collecting voice from a user; and
wherein the acquisition means acquires from the storage means the operational content for the audio-related function associated with the operation pattern of the voice command detected by the operation detecting means, among the plurality of operational contents for the audio-related function stored by the first storage means.

4. The terminal device according to claim 1,
wherein the operation detecting means, when judged that the operation mean identified by the identifying means coincides with the operation means stored by the second storage means and is swing operation, detects an operation pattern of the swing operation as a user operation based on a swing operation of the device housing; and
wherein the acquisition means acquires for the audio-related function associated with the operation pattern of the swing operation detected by the operation detecting means as the user operation, among the plurality of operational contents for the audio-related function stored by the first storage means.

5. A non-transitory computer-readable storage medium having a program stored thereon that is executable by a computer to perform a process comprising:
parallel processing for processing in parallel a plurality of functions including an audio-related function;
first storage processing for storing, with respect to a plurality of operating means, including operation of a touch screen, a gesture, a voice command and a swing operation, other than operation from a key operating section, which is assignable when the audio-related function runs in a background process, operations performed by a user with each of the plurality of operating means in association with a plurality of operational contents for the audio-related function, respectively;
second storage processing for storing an operating means set in advance by the user among the plurality of operating means as an operating means to be assigned when the audio-related function runs in the background process;
first judging processing for judging whether the audio-related function is running in the background process in parallel with a function running in a foreground process;
first controlling processing for, when the first judging processing judges that the audio-related function is running in the background process, automatically controlling to assign display outputs to a display section and operation inputs from the key operating section to the function running in the foreground process;
operation detecting processing for detecting an operation performed by a user other than the operation from the key operating section;
identifying processing for specifying an operating means from the operation detected by the operation detecting processing;
second judging processing for, when the first judging processing judges that the audio-related function is running in the background process, judging whether the operation means identified by the identifying processing coincides with the operation means stored by the second storage processing;
acquisition processing for, when the operation means identified by the identifying processing coincides with the operation means stored by the second storage processing, acquiring an operational content for the audio-related function associated with the operation detected by the operation detecting processing from the first storage processing; and
control processing for instructing the audio-related function running in the background process to perform the operational content acquired by the acquisition processing;
wherein, when judged that the operation means identified by the identifying processing coincides with the operation means stored by the second storage processing and is touch screen operation, the operation detecting means detects as a user operation an operation pattern of the touch screen operation which has been performed in the display section including a touch screen; and
wherein the acquisition processing acquires an operational content for the audio-related function associated with the operation pattern of the touch screen operation detected by the detecting processing, among the plurality of operational contents for the audio-related function stored by the first storage processing.

* * * * *